Jan. 3, 1961  F. K. H. NALLINGER  2,966,902
FUEL SUPPLY SYSTEM FOR INTERNAL COMBUSTION ENGINES
Filed Jan. 28, 1958
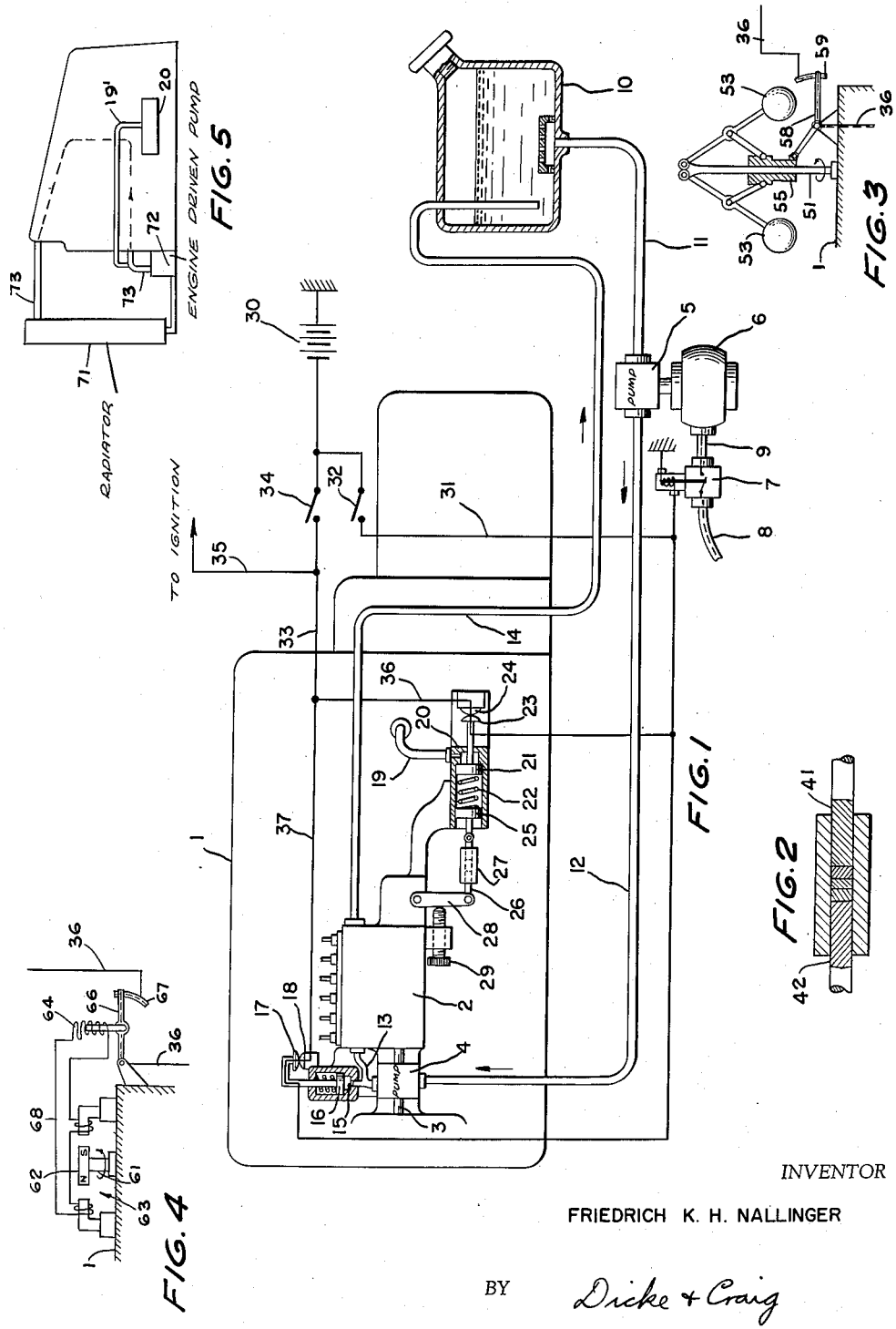
INVENTOR
FRIEDRICH K. H. NALLINGER
BY Dicke + Craig
ATTORNEYS United States Patent Office 2,966,902
Patented Jan. 3, 1961

2,966,902
FUEL SUPPLY SYSTEM FOR INTERNAL COMBUSTION ENGINES

Friedrich K. H. Nallinger, Stuttgart, Germany, assignor to Daimler-Benz Aktiengesellschaft, Stuttgart-Unterturkheim, Germany Filed Jan. 28, 1958, Ser. No. 711,655
Claims priority, application Germany Feb. 5, 1957
25 Claims. (Cl. 123—139)

The present invention relates to a fuel supply system for internal combustion engines, particularly for motor vehicles, which is equipped with a main fuel booster pump driven by the engine and an auxiliary fuel booster pump driven independently of the internal combustion engine.

Such auxiliary booster pumps generally have the purpose of circulating fuel through the fuel system including the fuel lines and possibly the fuel injection pump before and during starting of the internal combustion engine so as to liberate the fuel from entrenched gas bubbles and to produce the fuel pressure necessary for operation of the engine. Inasmuch as such an auxiliary booster pump, in order to fulfill this task, cannot be driven by the internal combustion engine, but must deliver full pressure and the full quality of fuel as quickly as possible, the pumps as well as its drive member, generally an electric motor, must run relatively fast. As a result of this relatively high operating speed, noise is produced which can be tolerated for short periods of time before and during the starting process of motor vehicles and the like, but are particularly disturbing when the engine during normal vehicle operation runs for any length of time at a relatively low speed, as, for instance, at idling speed. In order to avoid this disturbing noise during vehicle travel, the present invention proposes an arrangement in which the auxiliary fuel booster pump is shut off as soon as the speed of the internal combustion engine exceeds a predetermined value below the idling speed of the internal combustion engine. Aside from the above-mentioned advantages of such an installation regarding avoidance of disturbing noise, it is also advantageous if the auxiliary booster pump and its driving member are in operation only when such operation is really necessary, that is, that it does not run during normal engine operation when the main booster pump which, as in most cases is driven by the internal combustion engine itself, delivers a satisfactory amount of fuel.

The shut-off mechanism for the auxiliary booster pump can be controlled by a direct speed-sensitive device which, for instance, works on the centrifugal principle or is operated electrically; but it is also possible and in many cases especially simple to have it controlled by an indirect speed-sensitive device as, for instance, a device which is responsive to the pressure in the engine circulating system such as the lubricating oil system or the cooling water system.

It is advantageous to provide the shut-off mechanism for the auxiliary booster pump with an adjusting mechanism with which the speed of the internal combustion engine may be varied at which the auxiliary booster pump is to shut off. Furthermore, the present invention proposes that the arrangement be constructed in such a manner that the device for adjusting the auxiliary pump shut-off mechanism is operatively connected with a member for adjusting the idling speed of the engine so that when the engine is adjusted to a different idling speed, the shut-off of the auxiliary pump will occur at a correspondingly different engine speed.

Appropriately, the auxiliary booster pump is brought into operation by operating the main switch of the electrical circuit of an internal combustion engine in a motor vehicle. This switch may be the ignition switch of an auto-ignited internal combustion engine, that is, the switch which normally is operated by a key in motor vehicles incorporated in the electrical circuit of diesel engines. In order that the auxiliary booster pump, if necessary, may be started arbitrarily and at any time, a separate emergency switch may be provided. It is thereby favorable to provide a control by means of which the auxiliary booster pump may be started at any speed of the internal combustion engine so that the auxiliary booster pump may be put into operation and kept in operation when the main booster pump, during normal engine operation, fails for any reason whatsoever.

Naturally, such an emergency control could also be operated automatically, for instance, by a switch that is responsive to the fuel pressure prevailing in the fuel system behind the main booster pump and with which the auxiliary booster pump may be brought into operation at pressures in the fuel system which are below the range of pressures for normal operation of the engine and at engine speeds which lie above the speed at which the auxiliary booster pump is normally cut out provided the main switch of the electrical circuit of the internal combustion engine or the motor vehicles is in the closed position.

A relatively simple installation of the type described hereinabove may be so constructed that the electric circuit for starting and operating the auxiliary booster pump includes three parallel branch circuits, one of which is controlled by a manually operated switch, the second of which is controlled by the main switch of the electrical circuit of the internal combustion engine or the motor vehicle together with another or a third switch which is opened when the lubrication oil pressure of the internal combustion engine exceeds a certain predetermined amount, and the third circuit of which also includes the main switch and a fourth switch which is operated when the fuel pressure behind the main booster pump reaches a value sufficient for normal engine operation.

Finally, it is also possible in accordance with the present invention to provide an installation in which the auxiliary booster pump is brought into operation at a certain speed of the internal combustion engine which lies above the idling speed and which may be set either arbitrarily or automatically. Such an arrangement may be used when the main booster pump alone is not capable of delivering the necessary fuel required for high engine speeds and loads so that under normal operation or special load requirements both the auxiliary and main fuel booster pumps operate together.

Accordingly, it is an object of the present invention to provide a fuel supply system for internal combustion engines with an auxiliary automatically controlled booster pump that is driven by a source other than the engine.

It is another object of the present invention to provide a fuel supply system for internal combustion engines with an auxiliary booster pump that can be brought into operation for purposes of circulating fuel through the system and building up the pressure therein before the engine is actually started.

Still another object of the present invention resides in the provision of a control installation to render the control of the operation of the auxiliary booster pump responsive to the lubricating oil pressure or circulating water pressure of the engine in order to automatically stop the auxiliary pump at a speed below idling speed of the engine.

Still another object of the present invention resides in the provision of a system which controls the operation of the auxiliary booster pump in response to the fuel discharge pressure of the main booster pump of the fuel system.

A further object of the present invention resides in the provision of an emergency switch with which the auxiliary booster pump may be brought into operation regardless of the speed of the engine, of the fuel pressure in the system and of the lubrication oil pressure of the engine.

A still further object of the present invention lies therein that the auxiliary booster pump may be brought into operation at any time to furnish fuel to the engine if the main booster pump fails or to assist the main booster pump while the engine operates at high speed or exceptionally high loads.

Another object of the present invention resides in the provision of a fuel supply system for internal combustion engines in which an engine idling speed adjusting device is interconnected with the shut-off device of the auxiliary booster pump so that for higher or lower idling speeds of the engine the speed at which the auxiliary booster pump is cut out is correspondingly raised or lowered.

These and further objects, features and advantages of the present invention will become more obvious from the following description of a fuel supply system for internal combustion engines in accordance with the present invention when taken in connection with the accompanying drawing which shows in the Figures 1 through 5 thereof, for purposes of illustration only, several embodiments in accordance with the present invention and wherein Figure 1 is a schematic view of the overall installation of a fuel supply system according to the present invention wherein the speed-responsive device for controlling the operation of the auxiliary pump is responsive to the pressure of the engine-lubricating oil system, Figure 2 is a detailed view of the adjusting nut of Figure 1, Figure 3 is a schematic view of an embodiment according to the present invention wherein the speed-responsive device controlling the operation of the auxiliary pump is responsive to a centrifugal operated governor, Figure 4 is a schematic view of an embodiment in accordance with the present invention wherein the speed-responsive device for controlling the operation of the auxiliary pump is responsive to an electrical speed-responsive device, and Figure 5 is a schematic view of an embodiment according to the present invention wherein the speed-responsive device for controlling the operation of the auxiliary pump is responsive to the pressure of the engine cooling-water circulatory system.

In the embodiment according to Figure 1, reference numeral 1 designates schematically an internal combustion engine employing fuel injection. A fuel injection pump 2 is driven by the internal combustion engine by way of shaft 3. The shaft 3 at the same time serves as a drive for the main fuel booster pump 4 of the fuel supply system. An auxiliary fuel booster pump 5 may be driven by a motor 6 when the relay switch 7 is operated so as to allow energy, for instance, electrical energy or pneumatic energy to flow from line 8 into line 9 that leads to the motor 6.

The fuel flows from the fuel reservoir 10 through a line 11 to the auxiliary booster pump 5 and from there through a line 12 to the main booster pump 4. This main booster pump 4 forces the fuel through a line 13 into the fuel pump 2. The excess fuel returns through a line 14 to the reservoir 10. From the line 13 the fuel flows through a branch line into the cylinder 15 where it tends to move the piston 16 upwardly against a spring pressure. A movable contact member 17 is operatively connected or combined with the piston rod of the piston 16 which movable contact member 17 is separated from the stationary counter-contact member 18 when the piston 16 moves upwardly.

The lubricating oil pressure of the internal combustion engine is transmitted through a line 19 into a cylinder 20 in which it tends to move a piston 21 toward the left, as seen in the drawing, against the pressure of a spring 22. A movable contact 23 is operatively connected or combined with the piston 21 and is separated from the stationary contact member 24 by a movement to the left of the piston 21. The other side of the spring 22 abuts against a movable stop member 25. The abutment or stop member 25 is connected with a lever 28 through a longitudinally adjustable linkage 26 including an adjusting nut 27.

As shown in Figure 2, the adjusting nut includes left-hand threads 42 and right-hand threads 41. The lever 28 adjusts the fuel quantity injected with the help of a control mechanism at the injection pump 2. The setting position of the lever 28 is determined by the idling-adjusting screw 29. The spring 22 keeps the lever 28 pressed against the screw 29 at all times.

The electric relay switch 7 is actuated by a current supplied from battery 30 and flows either through a line 31, including a separate switch 32 or through a line 33 which includes the ignition or main switch 34 of the internal combustion engine. The branch line 35 leads to the ignition apparatus. The line 33 branches out into the lines 36 and 37. From the line 36 the current flows through the contact members 23 and 24 and from the line 37 through the contact members 17 and 18 to the relay switch 7.

*Operation*

The positions of the various members shown in Figure 1 are those in which they are before the internal combustion engine is started up. If the engine is to be put into operation, i.e., is to be started up, the switch 34 is closed whereby, on the one hand, voltage is applied through line 35 to the ignition apparatus and, on the other hand, through the lines 36 and 37 and the contact members 23, 24 and 17, 18 to the relay switch 7. The relay magnet in the switch 7 responds to this voltage so that energy flows to the motor 6 through line 9 whereby the auxiliary booster pump 5 begins delivery of fuel. As soon as the pressure in the line 13 and also in the cylinder space 15 during the starting process of the engine builds up to normal as a result of the commencement of operation of the main booster pump 4, the piston 16 is moved upwardly by this pressure so that the flow of current in the line 37 is interrupted by opening of the contact members 17 and 18. Nevertheless, the auxiliary booster pump 5 keeps operating inasmuch as the relay switch 7 still receives current through the line 36 and closed contact members 23 and 24. Shortly before the internal combustion engine reaches idling speed, the oil pressure in the internal combustion engine and also in the line 19 and cylinder 20 has reached such a magnitude that it moves the piston 21 toward the left by overcoming the force of the spring 22 which acts thereon. By this movement toward the left, the contact members 23 and 24 are separated or opened. The relay switch 7 ceases to receive current and blocks off the flow of energy into the line 9 and to the motor 6 so that the auxiliary booster pump 5 comes to rest. The delivery of fuel is now taken over by the main booster pump 4 alone. For the sake of simplicity, it is assumed in the drawing that the main booster pump 4 as well as the auxiliary booster pump 5 allow passage of the fuel therethrough even when they are at rest. In the case where types of pumps are provided which do not allow such free passage while they are at rest, by-pass lines with corresponding non-return valves are provided in a known manner.

As is quite apparent from Figure 1, current may be supplied to the relay switch 7 at any time by closing the separate or emergency switch 32 whereby the auxiliary booster pump 5 may be brought into operation at the will of the driver or operator. If, during normal operation of the engine, the delivery of the main booster pump 4 should for any reason discontinue or the pressure of the pump become insufficient for operation of the engine, then the piston 16 is moved by the spring force acting thereon downwardly into the illustrated position whereby, as a result thereof, the contact members 17 and 18 will be brought together again. In such a case, the relay switch 7 receives current through line 37 and the auxiliary booster pump 5 will automatically be brought into operation and will take over delivery of the fuel in place of the main booster pump 4. The auxiliary booster pump is adjusted so that it produces a pressure sufficient for operation but not as high as the normal pressure produced by the main booster pump 4 so that the piston 16 would not be lifted under these operating conditions.

The length of the linkage 26 may be changed by appropriate rotation of nut 27 whereby the tension of the spring 22 is varied. By this means the oil pressure at which the plunger 21 commences to move to the left is varied. Inasmuch as the oil pressure is a certain function of the speed of the internal combustion engine, the speed at which the auxiliary booster pump 5 is to be shut off may be adjusted thereby to any desired value. At the same time, the initial tension of the spring 22 is also changed by rotation of the adjusting screw 29 which effects a change of the idling speed of the engine and therewith also of the speed at which the auxiliary pump 6 is automatically shut off.

In summary, the present invention provides a control arrangement for the auxiliary booster pump which is independent of the pressure of the fuel, i.e., of the conditions prevailing in the fuel system.

In connection therewith, it should be noted that contact members 17 and 18 do not open if the pressure in the fuel system is derived solely by the auxiliary booster pump 6. On the other hand, as soon as the engine starts up, though still below normal idling speed, the pump 4 which is driven by the engine and the output of which is, therefore, a function of the engine speed, increases the fuel pressure to open contact members 17 and 18. However, the pressure in line 19 only builds up sufficiently to open contact members 23 and 24 as the engine picks up speed and proceeds from starting speed to idling speed thereof. Thus, the primary control of auxiliary booster pump 6 is obtained by contact members 23 and 24.

While it might be possible to make the control of the auxiliary booster pump dependent directly on the fuel pressure, this is not desirable since the pressure in the fuel system is not unequivocally dependent on the rotational speed of the internal combustion engine but also is influenced by the pressure supplied by the auxiliary pump whereby the auxiliary booster pump operates independently of the rotational speed of the combustion engine. Consequently, a control in dependence on the fuel pressure alone might not result in a control responsive to the speed of the engine. On the other hand, it is particularly important that in cutting off the auxiliary booster pump, the rotational speed of the internal combustion engine is sufficiently large in order to enable the main booster pump driven by the engine to take over exclusively the task of supplying the fuel. It is for this reason that the present invention provides an arrangement for the control either directly or indirectly in response to the engine rotational speed.

Other arrangements than using the engine lubricating oil system may be used to control the operation of the auxiliary pump either directly or indirectly in response to the engine rotational speed.

Figure 3 illustrates an embodiment of the present invention wherein the lubricating oil pressure-responsive device is replaced by a centrifugally operated governor of standard type. The rotatable shaft 51 is operatively connected to the internal combustion engine 1 and the engine shaft 3 for rotation thereby. This shaft 51 carries flyweights 53 attached to a sleeve 55. A switch, including contacts 58 and 59, is connected into line 36 in a manner corresponding to the contacts 23 and 24 of Figure 1 which the switch replaces. The positions of the various members shown in Figure 3 are those in which they are before the internal combustion engine is started up. If the engine is put into operation, the shaft 51 will be rotated by the engine and the fly-weights 53 will be thrown outwardly by centrifugal force and the sleeve 55 will thereby be drawn upwardly. Shortly before the internal combustion engine reaches idling speed, the sleeve 55 will be drawn upwardly to such an extent that the contact members 58 and 59 are separated or opened. As with contacts 23 and 24 in Figure 1, the relay switch 7 will thereby cease to receive current and the auxiliary pump 5 will come to rest.

Figure 4 shows another embodiment according to the present invention wherein the switch, including contacts 67 and 66, controls line 36 in a manner similar to contacts 23 and 24 of Figure 1. The operation of the switch is controlled by a solenoid 64. Current is supplied to solenoid 64 through line 68 in proportion to the speed of the internal combustion engine 1 by a generator 63. This current is generated by an armature 62 which is rotated by a shaft 61 operatively connected to the internal combustion engine 1 and its shaft 3. As the shaft 61 rotates in relation to the internal combustion engine shaft 3, current proportional to the speed of the engine is created and passes through the solenoid 64 to control the positions of the contacts 66 and 67.

Figure 5 illustrates another embodiment of the present invention wherein the apparatus is substantially identical to that in Figure 1. In Figure 5 a conduit 19' connecting the valve 20 with the cooling water circulatory system replaces the conduit 19 of Figure 1. The cooling water circulatory system includes a conduit system 73, radiator 71 and an engine-driven pump 72 for circulating the water. This engine-driven pump supplies a pressure proportional to the speed of the internal combustion engine 1, and accordingly, the valve 20 is controlled in response to the speed of the internal combustion engine.

Additionally, the auxiliary booster pump of the present invention is to be so selected that it supplies at least the quantity of fuel necessary during starting for the operation of the internal combustion engine. In this manner, it is possible to provide a satisfactory operation by a sufficiently large pressure produced by the auxiliary booster pump even with rotational speeds immediately after starting at which the main booster pump driven by the engine possibly cannot yet supply the fuel pressure or has not been able to remove all the bubbles or the like from the supply lines.

It is of significance in connection with the present invention that the auxiliary booster pump and the drive motor thereof are no longer to operate during the idling speed of the internal combustion engine in order to avoid unnecessary noises and vibration as well as unnecessary wear thereof if the internal combustion engine, for example, installed in a motor vehicle has to operate oftentimes in idling speed during the operation thereof. It is for this reason that the present invention provides a control arrangement which cuts off the auxiliary booster pump at a rotational speed which is below the idling speed of the engine.

While I have shown several embodiments of my invention, it is understood that the same is not limited thereto, but is susceptible of many changes and modifications within the spirit of the present invention and the scope of a person skilled in the art, and I, therefore, intend to cover all such changes and modifications as encompassed by the appended claims.

I claim:

1. A fuel supply system for internal combustion engines comprising a main fuel booster pump operatively connected in said fuel supply system and driven by the engine, an auxiliary fuel booster pump also interconnected in said system, drive means independent of said engine for driving said auxiliary booster pump, and control means for controlling said auxiliary pump in response to the rotational speed of said engine to automatically shut off said auxiliary pump when the rotative speed of said engine reaches a certain predetermined value above the starting speed thereof.

2. A fuel supply system for internal combustion engines according to claim 1, wherein said control means is operative to shut off said auxiliary booster pump at a rotative speed of said engine below normal idling speed thereof.

3. A fuel supply system for internal combustion engines according to claim 1, wherein said control means includes a centrifugally operated speed-responsive device for controlling the operation of said auxiliary pump.

4. A fuel supply system for internal combustion engines according to claim 1, wherein said control means includes an electrical speed-responsive device for controlling the operation of said auxiliary pump.

5. A fuel supply system for internal combustion engines according to claim 1, wherein the capacity of said auxiliary booster pump is at least sufficient for sustaining by itself operation of said engine during the starting process thereof.

6. A fuel supply system for internal combustion engines according to claim 1, wherein said control means includes speed-responsive means indirectly responsive to the speed of the engine for controlling the operation of said auxiliary booster pump.

7. A fuel supply system according to claim 6, wherein said speed-responsive means is responsive to the pressure of the engine lubricating oil system.

8. A fuel supply system for internal combustion engines according to claim 6, wherein said speed-responsive means is responsive to the pressure in the cooling water circulating system of the engine for controlling the operation of said auxiliary booster pump.

9. A fuel supply system for internal combustion engines comprising a main fuel booster pump operatively connected in said fuel supply system and driven by the engine, and an auxiliary fuel booster pump also interconnected in said system, drive means independent of said engine for driving said auxiliary booster pump, control means for controlling the operation of said auxiliary pump in response to the rotational speed of said engine so as to automatically shut off said auxiliary pump when the rotative speed of said engine reaches a certain predetermined value above the starting speed and below the normal idling speed thereof, and adjusting means operatively connected with said control means for selectively adjusting the engine speed at which said auxiliary pump is stopped.

10. A fuel supply system for internal combustion engine according to claim 9, wherein said adjusting means includes regulating means for selectively setting the idling speed of said engine, said regulating means being operatively connected with said adjusting means in such a manner that a variation in the setting of the engine idling speed of said engine effects a corresponding variation in the speed at which said auxiliary pump is shut off.

11. A fuel supply system for internal combustion engine according to claim 1, further comprising an electric circuit including a main switch and a source of energy, and electrical means for actuating said control means, said drive means for said auxiliary pump being rendered ineffective when said main switch is opened.

12. A fuel supply system for internal combustion engine according to claim 1, further comprising a main electrical circuit, a source of energy, a main switch, and electrical means for actuating said control means to render said drive means for said auxiliary pump ineffective when said main switch is opened, said electric circuit further including a second circuit arranged in parallel with said main circuit including a second switch for actuating said control means to put said auxiliary booster pump into operation regardless of the position of said main switch.

13. A fuel supply system for internal combustion engines according to claim 12, wherein said auxiliary pump may be brought into operation by said second switch regardless of the rotative speed of said engine.

14. A fuel supply system for internal combustion engines comprising a main fuel booster pump operatively connected in said fuel supply system and driven by the engine, an auxiliary fuel booster pump also interconnected in said system, drive means independent of said engine for driving said auxiliary booster pump, control means for controlling the operation of said auxiliary pump in response to the rotational speed of said engine so as to automatically shut off said auxiliary pump when the rotative speed of said engine reaches a certain predetermined value above the starting speed thereof, an electrical circuit including a main switch and a source of energy and electrical means for actuating said control means to render said drive means for said auxiliary pump ineffective when said main switch is opened, a third electrical circuit including a third switch responsive to the fuel discharge pressure of said main booster pump to actuate and render said control means effective and thereby put said auxiliary pump into operation while the fuel pressure in said system is below that required for normal engine operation and at engine speeds above that at which the auxiliary pump is normally shut off.

15. A fuel supply system for internal combustion engines including a liquid circulating system comprising a main fuel booster pump operatively connected in said fuel supply system and driven by the engine, an auxiliary fuel booster pump also interconnected in said system, drive means independent of said engine for driving said auxiliary booster pump, and control means for controlling operation of said auxiliary pump in response to a condition of the liquid in said circulating system that varies with the rotational speed of said engine so as to automatically shut off said auxiliary pump when the rotative speed of said engine reaches a certain predetermined value above the starting speed thereof including a main electrical circuit having a source of energy and having three circuits for separately effecting operation of said auxiliary pump, one of said circuits including an arbitrarily-operated auxiliary switch, the second circuit including the main switch of the electric circuit of said engine and a further pressure-responsive switch that disconnects said control means when the pressure in said liquid circulating system of said engine exceeds a certain predetermined value, and the third circuit including said main switch and a fourth switch which effects operation of said auxiliary pump before the normal operating pressure is reached on the output side of said main booster pump.

16. A fuel supply system for internal combustion engines according to claim 1, further comprising means for rendering said auxiliary pump operative at engine speeds above idling, said last-mentioned means being operated in at least one of two ways consisting of being operated arbitrarily and automatically in response to the engine speed.

17. A fuel supply system for internal combustion engines comprising a main booster pump interconnected in said system, an auxiliary booster pump also interconnected in said system, drive means for driving said auxiliary booster pump independently of said engine, said auxiliary booster pump supplying a sufficient amount of fuel to enable operation of said engine during starting thereof, and control means responsive to the rotational speed of said internal combustion engine for controlling said drive means to cut off said auxiliary booster pump when said engine reaches a predetermined rotational speed above starting speed but below normal idling speed thereof.

18. A fuel supply system according to claim 17, wherein said control means is responsive to the pressure of the oil circulating system of said engine.

19. A fuel supply system according to claim 17, wherein said control means includes a centrifugal governor driven by said internal combustion engine to control said drive means.

20. A fuel supply system according to claim 17, further comprising means for rendering said control means ineffectual and selectively cutting in said auxiliary booster pump at the will of the driver.

21. A fuel supply system according to claim 17, wherein said control means is responsive to the pressure of the water cooling system of said engine.

22. A fuel supply system for internal combustion engines comprising a main fuel booster pump operatively connected in said fuel supply system and driven by the engine, an auxiliary fuel booster pump also interconnected in said system, drive means independent of said engine for driving said auxiliary booster pump, and control means for controlling said auxiliary pump in response to the rotational speed of said engine to automatically shut off said auxiliary pump when the rotative speed of said engine reaches a certain predetermined value above the starting speed thereof, further comprising a main electrical circuit, a source of energy, a main switch, and electrical means for actuating said control means to render said drive means for said auxiliary pump ineffective when said main switch is opened, said electric circuit further including a second circuit arranged in parallel with said main circuit including a second switch for actuating said control means to put said auxiliary booster pump into operation regardless of the position of said main switch.

23. A fuel supply system for internal combustion engines comprising a main fuel booster pump operatively connected in said fuel supply system and driven by the engine, an auxiliary fuel booster pump also interconnected in said system, drive means independent of said engine for driving said auxiliary booster pump, and control means for controlling said auxiliary pump in response to the rotational speed of said engine to automatically shut off said auxiliary pump when the rotative speed of said engine reaches a certain predetermined value above the starting speed thereof, further comprising a main electrical circuit, a source of energy, a main switch, and electrical means for actuating said control means to render said drive means for said auxiliary pump ineffective when said main switch is opened, said electric circuit further including a second circuit arranged in parallel with said main circuit including a second switch for actuating said control means to put said auxiliary booster pump into operation regardless of the position of said main switch, said auxiliary pump may be brought into operation by said second switch regardless of the rotative speed of said engine.

24. A fuel supply system for internal combustion engines comprising a main fuel booster pump operatively connected in said fuel supply system, and an auxiliary fuel booster pump also interconnected in said system, drive means independent of said engine for driving said auxiliary booster pump, control means for controlling the operation of said auxiliary pump in response to the rotational speed of said engine so as to automatically shut off said auxiliary pump when the rotative speed of said engine reaches a certain predetermined value above the starting speed and below the normal idling speed thereof, and adjusting means operatively connected with said control means for selectively adjusting the engine speed at which said auxiliary pump is stopped.

25. A fuel supply system for internal combustion engines comprising a main fuel booster pump operatively connected in said fuel supply system and driven by the engine, an auxiliary fuel booster pump also interconnected in said system, drive means independent of said engine for driving said auxiliary booster pump, and control means for controlling operation of said auxiliary pump in response to the rotational speed of said engine so as to automatically shut off said auxiliary pump when the rotative speed of said engine reaches a certain predetermined value above the starting speed thereof including a main electrical circuit having a source of energy and having three circuits for separately effecting operation of said auxiliary pump, one of said circuits including an arbitrarily-operated auxiliary switch, the second circuit including a further switch responsive to the speed of said engine to disconnect said control means when the engine exceeds a certain predetermined value, and the third circuit including a fourth switch which effects operation of said auxiliary pump before the normal operating pressure is reached on the output side of said main booster pump.

References Cited in the file of this patent

UNITED STATES PATENTS 2,410,774    Chandler _____ Nov. 5, 1946

FOREIGN PATENTS 779,546    Great Britain _____ July 24, 1957